(12) United States Patent
Lin

(10) Patent No.: US 9,686,557 B2
(45) Date of Patent: Jun. 20, 2017

(54) QUANTIZER PARAMETER DETERMINATION FOR VIDEO ENCODER RATE CONTROL

(75) Inventor: Shu Lin, Santa Clarita, CA (US)

(73) Assignee: Thomson Licensing S.A. (FR)

( * ) Notice: Subject to any disclaimer, the term of this patent is extended or adjusted under 35 U.S.C. 154(b) by 2832 days.

(21) Appl. No.: 11/791,288

(22) PCT Filed: Jun. 15, 2005

(86) PCT No.: PCT/US2005/021119
§ 371 (c)(1),
(2), (4) Date: May 22, 2007

(87) PCT Pub. No.: WO2006/060037
PCT Pub. Date: Jun. 8, 2006

(65) Prior Publication Data
US 2008/0063052 A1    Mar. 13, 2008

Related U.S. Application Data

(60) Provisional application No. 60/632,452, filed on Dec. 2, 2004.

(51) Int. Cl.
*H04N 7/12* (2006.01)
*H04N 19/179* (2014.01)
(Continued)

(52) U.S. Cl.
CPC ......... *H04N 19/179* (2014.11); *H04N 19/115* (2014.11); *H04N 19/124* (2014.11);
(Continued)

(58) Field of Classification Search
CPC .. H04N 19/179; H04N 19/197; H04N 19/176; H04N 19/172; H04N 19/149;
(Continued)

(56) References Cited

U.S. PATENT DOCUMENTS

| 5,721,589 A | 2/1998 | Murata |
| 6,181,742 B1 | 1/2001 | Rajagopalan et al. |

(Continued)

FOREIGN PATENT DOCUMENTS

| EP | 0478230 A2 | 9/1991 |
| EP | 0478230 | 4/1992 |

(Continued)

OTHER PUBLICATIONS

Fan J et al: "Adaptive Motion-Compensated Video Coding Scheme Towards Content-Based Bit Rate Allocation" Journal of Electronic Imaging, SPIE+ IS&T, US, vol. 9, No. 4 Oct. 2000 (Oct. 2000), pp. 521-533, XP001086815 ISSN: 1017-9909 the whole document search report dated Sep. 1, 2005.

*Primary Examiner* — Aravind Moorthy
(74) *Attorney, Agent, or Firm* — Jack Schwartz & Associates, PLLC

(57) ABSTRACT

An apparatus and corresponding method are provided for encoding video signal data by applying an adaptive quantizer parameter responsive to bit-rate; where a video encoder for encoding video signal data for an image block relative to at least one reference picture includes an adaptive quantizer for applying an adaptive quantizer parameter responsive to a current bit-rate; and where a corresponding method includes initializing an adaptive quantizer, calculating the bits used by the video signal data with the adaptive quantizer, assigning bits to each of a plurality of picture types, calculating a difference in adaptive quantizer responsive to the assigned bits from the previous number of bits used by the group of pictures and obtaining an updated adaptive quantizer for the video signal data, calculating an adaptive quantizer for a portion of the video signal data, encoding the portion of the video signal data, and obtaining the actual (Continued)

number of bits used for the encoded portion of the video signal data.

18 Claims, 2 Drawing Sheets

(51) Int. Cl.
  *H04N 19/196* (2014.01)
  *H04N 19/159* (2014.01)
  *H04N 19/176* (2014.01)
  *H04N 19/172* (2014.01)
  *H04N 19/149* (2014.01)
  *H04N 19/115* (2014.01)
  *H04N 19/61* (2014.01)
  *H04N 19/124* (2014.01)
  *H04N 19/14* (2014.01)
  *H04N 19/177* (2014.01)

(52) U.S. Cl.
  CPC ........... *H04N 19/14* (2014.11); *H04N 19/149* (2014.11); *H04N 19/159* (2014.11); *H04N 19/172* (2014.11); *H04N 19/176* (2014.11); *H04N 19/177* (2014.11); *H04N 19/197* (2014.11); *H04N 19/61* (2014.11)

(58) Field of Classification Search
  CPC .... H04N 19/159; H04N 19/61; H04N 19/124; H04N 19/14; H04N 19/177; H04N 19/115
  USPC ......................................... 375/240.02–240.03
  See application file for complete search history.

(56) References Cited

U.S. PATENT DOCUMENTS

| 6,192,075 | B1 | 2/2001 | Jeng et al. | |
| 6,654,417 | B1 | 11/2003 | Hui | |
| 6,891,889 | B2* | 5/2005 | Kim et al. | 375/240.03 |
| 2002/0064226 | A1* | 5/2002 | Bauer et al. | 375/240.02 |
| 2004/0161034 | A1 | 8/2004 | Morozov et al. | |

FOREIGN PATENT DOCUMENTS

| EP | 0540961 | 10/1992 |
| EP | 0540961 A2 | 10/1992 |
| EP | 1250012 A2 | 3/2002 |
| EP | 1250012 | 10/2002 |
| JP | 4079587 | 3/1992 |
| WO | WO99/07158 | 2/1999 |
| WO | WO9907158 | 2/1999 |
| WO | WO03/084237 A2 | 10/2003 |
| WO | WO03084237 | 10/2003 |

* cited by examiner

QUANTIZER PARAMETER DETERMINATION FOR VIDEO ENCODER RATE CONTROL

CROSS-REFERENCE TO RELATED APPLICATIONS

This application claims the benefit, under 35 U.S.C. §365 of International Application PCT/US2005/021119, filed Jun. 15, 2005, which was published in accordance with PCT Article 21(2) on Jun. 8, 2006 in English and which claims the benefit of U.S. provisional patent application No. 60/632,452, filed Dec. 2, 2004.

FIELD OF THE INVENTION

The present invention is directed towards video encoders, and in particular, towards determination of quantizer parameters for rate control in video encoders.

BACKGROUND

Video data is generally processed and transferred in the form of bit streams. Rate control involves the process of allocating bits for a group of pictures, a picture, a slice or a macroblock. A desirable rate control scheme should maximize picture quality for a given bit-rate. There are three general types of rate control, including constant bit-rate (CBR), variable bit-rate (VBR) and exact bits. The length of a sequence may or may not be known. If it is known, one can achieve exact bits for the compressed stream, which can be useful for some storage applications. CBR can be used for constant bit-rate transmission channels, such as in broadcast, for example. CBR only requires a small buffer and is normally used in a push mode. VBR can be used for variable bandwidth channels, such as for digital video disk (DVD). VBR typically requires a large buffer and is normally used in a pull mode. Because any channel has a limited bandwidth, VBR has two parameters. One VBR parameter is maximum bit-rate, and the other is average bit-rate. The VBR maximum bit-rate is set for a channel, and the VBR average bit-rate is set for storage space.

Prior methods for rate control have included Test Model 5 (TM5) rate control. Unfortunately, such methods allowed the picture quality to vary too much between pictures and caused blocking within pictures. Embodiments of the present invention address these and other issues.

SUMMARY

These and other drawbacks and disadvantages of the prior art are addressed by an apparatus and method for determination of quantizer parameters for rate control in video encoders.

In accordance with the principles of the present invention, a video encoder is provided for encoding video signal data for an image block relative to at least one reference picture, including an adaptive quantizer for applying an adaptive quantizer parameter responsive to a current bit-rate. A corresponding method includes initializing an adaptive quantizer, calculating the bits used by the video signal data with the adaptive quantizer, assigning bits to each of a plurality of picture types, calculating a difference in adaptive quantizer responsive to the assigned bits from the previous number of bits used by the group of pictures and obtaining an updated adaptive quantizer for the video signal data, calculating an adaptive quantizer for a portion of the video signal data, encoding the portion of the video signal data, and obtaining (250) the actual number of bits used for the encoded portion of the video signal data.

These and other aspects, features and advantages of the present invention will become apparent from the following description of exemplary embodiments, which is to be read in connection with the accompanying drawings.

BRIEF DESCRIPTION OF THE DRAWINGS

The present invention may be better understood by referencing, and in accordance with, the following exemplary figures, in which.

DETAILED DESCRIPTION OF PREFERRED EMBODIMENTS

Figure 1:
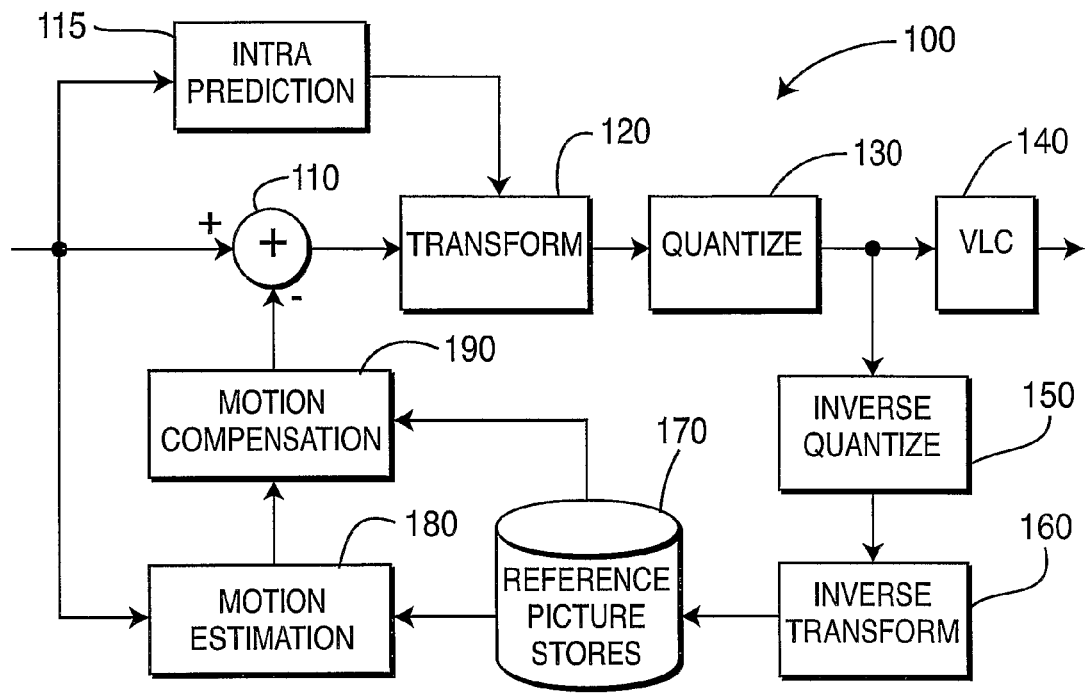
FIG. 1 shows a block diagram of a video encoder with adaptive determination of quantizer parameters for rate control in accordance with the principles of the present invention.

The present invention encompasses an apparatus and method for determination of quantizer parameters for rate control in video encoders. One embodiment described in the instant description is usable in rate control for H.264 video encoders or similar video compression schemes, for example; although application of the principles of the invention are not to be construed as being so limited. A new model is created to determine an adaptive quantizer parameter (QP) as a function of bit-rate. The adaptive QP optimizes the picture quality for various bit-rates. Previous encoding statistical information is used for encoding the next pictures.

Embodiments of the present invention may choose the QP according to bit-rate to accomplish rate control for video compression and encoding. A preferred embodiment creates and numerates a QP versus bit-rate model. A QP for a group of pictures (GOP) and for each type of picture is calculated by using the model such that picture quality is optimized at a given bit-rate. These and other embodiments improve picture quality variation between pictures, and blocking inside of pictures.

The following description merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included.

In the claims hereof any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a video encoder with determination of quantizer parameters for rate control is indicated generally by the reference numeral 100. An input to the encoder 100 is connected in signal communication with a non-inverting input of a summing junction 110. The output of the summing junction 110 is connected in signal communication with a block transformer 120. The input to the encoder 100 is further connected in signal communication with an intra prediction block 115 for I pictures, which has its output connected to a second input of the transformer 120. The transformer 120 is connected in signal communication with a quantizer 130. Although the invention described herein is conceptually part of the quantizer 130, it shall be understood that a separate quantizer parameter determination unit for rate control may feed the quantizer 130 in alternate embodiments, with the signaling between the units indicating which quantizer parameter to use. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a motion estimator 180 for multiple reference pictures. The input to the encoder 100 is further connected in signal communication with a second input of the motion estimator 180.

The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2:
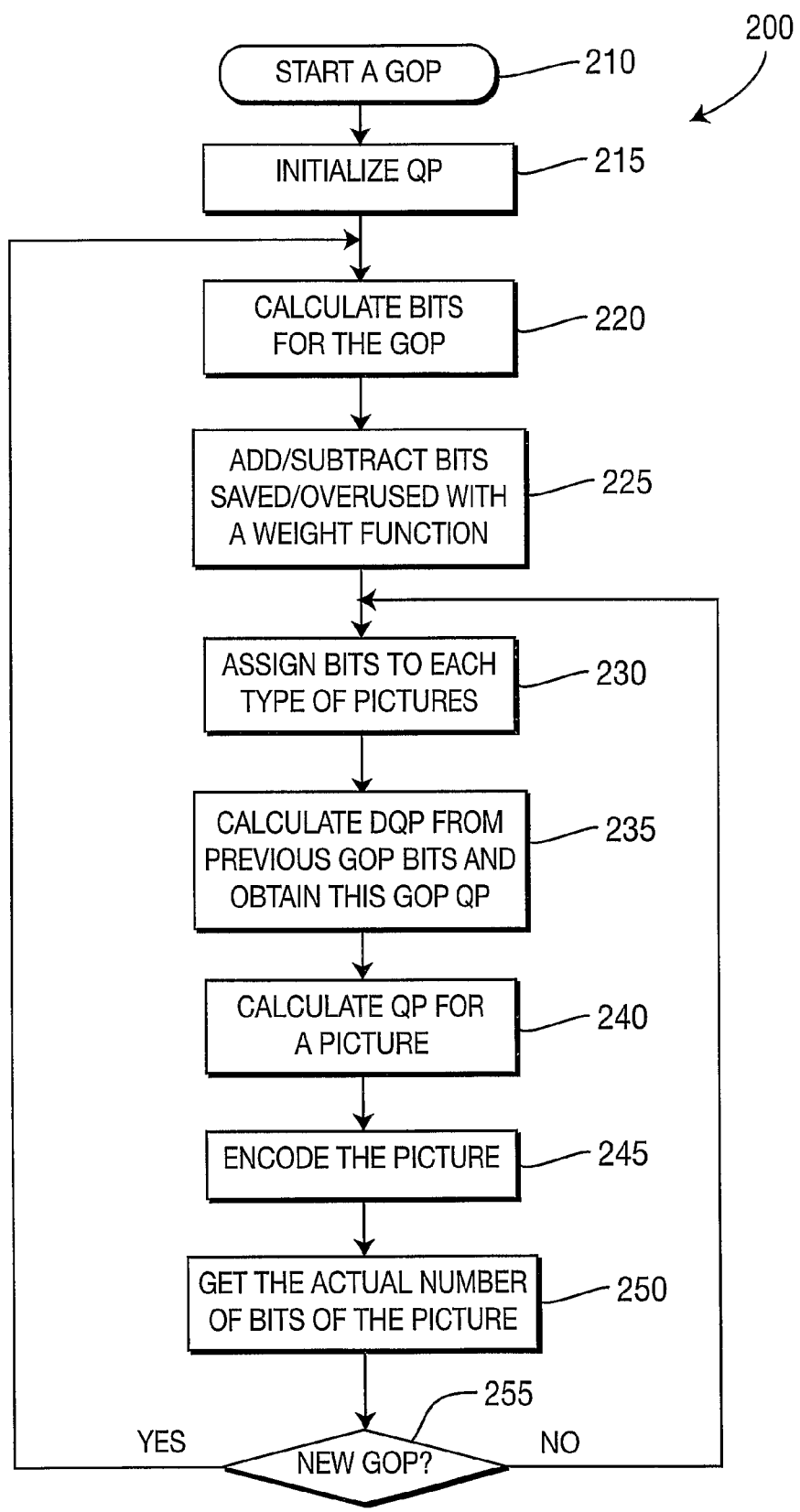
FIG. 2 shows a flow diagram for an encoding process with adaptive determination of quantizer parameters for rate control in accordance with the principles of the present invention.

Turning to FIG. 2, an exemplary encoding process with determination of quantizer parameters for rate control in accordance with the present invention is indicated generally by the reference numeral 200. The process 200 includes a starting point 210 to start encoding a group of pictures (GOP). An initialization step 215 is used to initialize a quantizer parameter (QP). In step 220, a calculation of the bits for the current GOP is performed. Step 225, adds bits saved with a weight function and subtracts bits overused with a weight function. Step 230 assigns bits to each type of picture. Step 235, in turn, calculates a difference QP (DQP) from previous GOP bits and obtains the QP for the current GOP. Step 240 calculates the QP for the current picture and passes control to step 245 to encode the picture. Step 250 determines the actual number of bits for the picture and passes control to a decision step 255. The decision step 255 determines whether to begin a new GOP, and if so, passes control back to step 220 for calculating bits for the new GOP. On the other hand, if decision step 255 makes the determination not to begin a new GOP, it passes control back to step 230 to assign bits for each type of picture.

Figure 3:
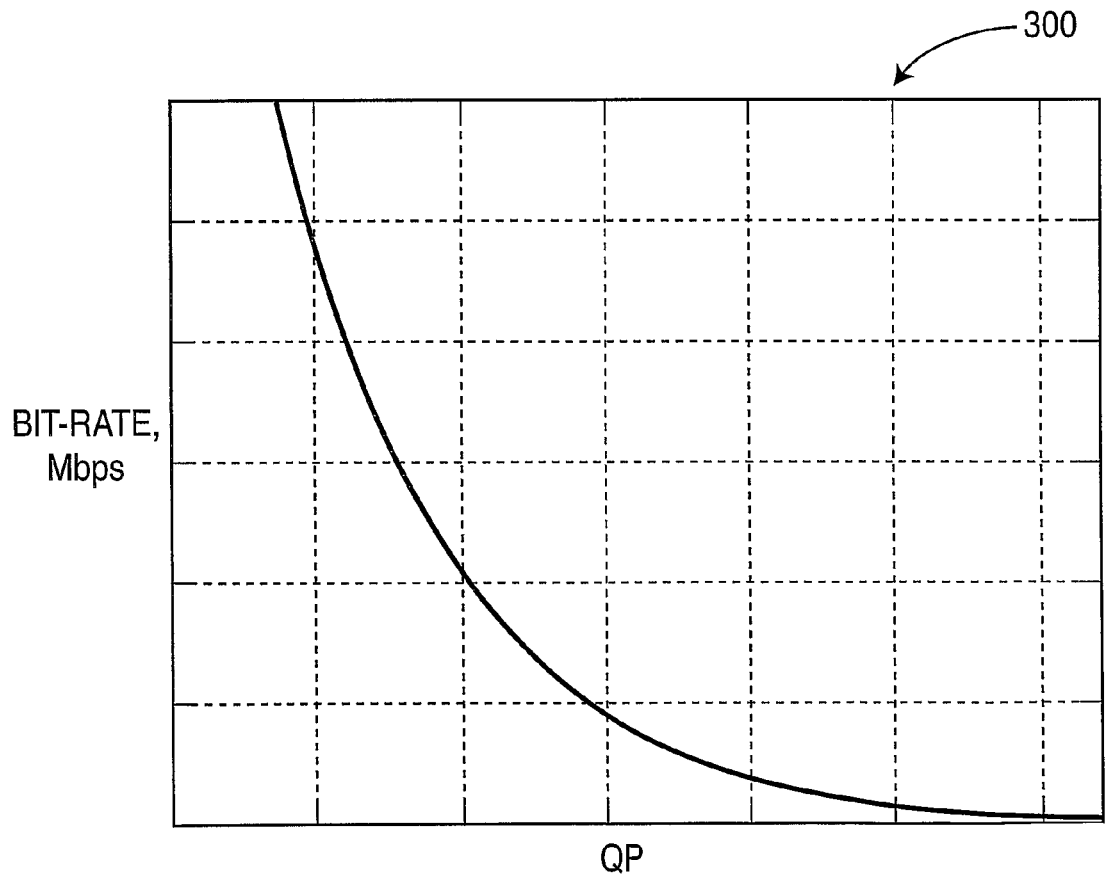
FIG. 3 shows a graphical diagram for a plot of quantizer parameter versus bit rate in accordance with the principles of the present invention.

Turning now to FIG. 3, plot of bit-rate versus quantizer parameter for rate control in accordance with principles of the present invention is indicated generally by the reference numeral 300. Here, quantizer parameter value is indicated along the horizontal axis with bit-rate value indicated along the vertical axis. The exemplary plot shows the QP and bit-rate curve for a HD video at a picture size of 1920×1080 and 24 Hz. In this exemplary embodiment, quantizer parameter value is generally increasing with respect to decreasing bit-rate, according to the following formula:

$$QP = -K * \log_a br + C \qquad \text{(Eqn. 1)}$$
$$K = -\frac{25}{9}, C = 38.8, a = 1.6$$

Rate control involves the process of allocating bits for a group of pictures, a picture, a slice and/or a macroblock. Preferred embodiments of the present invention assume that the length of a sequence is unknown. The group of pictures (GOP) includes pictures between two adjacent intra coded pictures, and also includes the first intra-coded picture.

Preferred embodiments of the present invention can meet bit-rate and/or storage requirements, avoid buffer overflow and underflow, encode good picture quality with a desired number of bits, limit picture quality variance between pictures, and encode good sequence quality at a desired bit-rate. A bit budget may be used for a sequence, a GOP, a picture, a slice and/or a macroblock.

A bit budget may assume, for example, that the total bits and/or length of a sequence is unknown, that a GOP means pictures between two adjacent I pictures, and that the initial picture bit budget ratio for I, P, and B types of pictures is I:P:B=6:3:1. The ratio may be updated after each GOP is encoded. For example, the initial bit budget ratio for a succeeding GOP may be initialized to the bit budget ratio resulting from the previous GOP. The bits may correspond to the maximum number of GOP bits (used only for VBR), the average GOP bits, the previous GOP bits, and the total available bits.

An estimate of encoding complexity may be obtained for an I picture or intra block as the sum of absolute difference, for a P picture as the sum of absolute prediction difference, for a B picture as the sum of absolute bidirectional prediction difference, and for a macroblock as the sum of absolute difference.

For an exemplary VBR embodiment, after each picture is encoded, the Encoder Buffer Level is increased by the number of Picture Bits, the bit-rate is selected as the minimum of the {Max Bit Rate, Encoder Buffer Level multiplied by the Picture Rate, and the (Decoder Buffer Size minus the Decoder Buffer Level) multiplied by the Picture Rate}, the Bit-rate is varying from picture to picture, the Decoder Buffer Level is increased by the Bit-rate divided by the Picture Rate, and, when a picture is removed, the Decoder Buffer Level is decreased by the Out Picture Bits.

For an exemplary CBR embodiment, after each picture is encoded, the Encoder Buffer Level is increased by the number of Picture Bits, the Bit-rate is the Bit-rate Specified, the Bit-rate is constant throughout the sequence, the Decoder Buffer Level is increased by the Bit-rate divided by the Picture Rate, and, when a picture is removed, the Decoder Buffer Level is decreased by the Out Picture Bits. A decoder buffer may be modeled with a buffer size set equal to the average bit-rate for 2-GOP bits. To avoid decoder buffer overflow, if the to-be-encoded picture might cause the decoder buffer to overflow, the encoder may reduce the picture size by increasing the QP. To avoid decoder buffer underflow, if the to-be-encoded picture might cause the decoder buffer to underflow, the encoder may increase the picture size by decreasing the QP and increase the bit-rate for VBR. An encoder buffer may be modeled by a Buffer size equal to the average bit-rate for 2-GOP bits. If the encoder buffer is in underflow, append zeros. If the to-be-encoded picture might cause the encoder buffer to underflow, increase the picture size. If the to-be-encoded picture might cause the encoder buffer to overflow, reduce the picture size. The end-to-end delay may be determined from encoder buffer output delay. For VBR, end-to-end delay may be determined from one picture, while six pictures have also been used successfully in verification experiments. For CBR, end-to-end delay may be determined from the starting output stream when the buffer is half full.

Decoder buffer delay may be computed as well. When a picture is scheduled to be removed, all bits of the picture shall be in the decoder buffer. For VBR, the decoder buffer delay depends on the maximum number bits of a picture, while six pictures have been used successfully in verification experiments. For CBR, the decoder buffer delay may be determined when the buffer is half full.

In operation, a bit budget for a picture in a GOP is determined by the target bit-rate, the bits consumed in the previous encoded GOP, and the difference bits between the targeted and the consumed bits up to the previous GOP.

$$TargetBits_{GOP} = \frac{BitRate * NumberOfPicturesInGOP}{PictureRate} \quad \text{(Eqn. 2)}$$

$$Bits_{GOP} = K_1 * TargetBits_{GOP} + K_2 * Bits_{PreviousGOP} + K_3 * Bits_{Remain}, \text{ where } K_1 + K_2 + K_3 = 1 \quad \text{(Eqn. 3)}$$

With terms defined below (see Eqn. 6), the number of bits of an intra coded picture is IeB times that of a B picture, and the number of bits of a P picture is PeB times that of a B picture. In a GOP, there is one I picture, $N_P$ P pictures, and $N_B$ B pictures. The target bits for each kind of picture is:

$$Itargetbits = \frac{TargetBits_{GOP} * IeB}{IeB + N_P * PeB + N_B} \quad \text{(Eqn. 4)}$$

$$Ptargetbits = \frac{TargetBits_{GOP} * PeB}{IeB + N_P * PeB + N_B}$$

$$Btargetbits = \frac{TargetBits_{GOP}}{IeB + N_P * PeB + N_B}$$

The first GOP Quantizer Parameter (QP) is initialized by using statistical results. For Each new GOP:

$$QP_{PreviousGOP} = I_B * QP_I + P_B \sum_{i=0}^{N_P} QP_{Pi} + \sum_{i=0}^{N_B} QP_{Bi} \quad \text{(Eqn. 5)}$$

$$dqp = \log_b PreGOPBitsUsed / Bits_{GOP}$$

$$QP_{GOP} = QP_{PreviousGOP} / (I_B + P_B * N_P + N_B) + dqp \quad \text{(Eqn. 6)}$$

where dqp is a difference QP and is added to the previous GOP to form the new GOP QP; b is the base, here b is chosen 1.4; $I_B$, $P_B$ are constants, they are the factors contributing to the GOP QP for I and P picture, respectively, here $I_B=4$, $P_B=2$;

The GOP Picture QP is used for the I picture QP.
For P pictures, $$Bits_P = K_{1P} * Bits_{PreviousP} + K_{1B} * Bits_{PreviousB} \quad \text{(Eqn. 7)}$$

where $K_{1P} + K_{1B} = 1$. In the case of no B pictures, $K_{1B}=0$; in the case of two B pictures between previous P and current P, $Bits_{PreviousB}$ is average bits of the two B pictures. Here, $K_{1P}=\frac{3}{4}$ for one B picture, ½ for 2 B pictures;

$$dqp_P = \log_c Bits_P / Ptargetbits \quad \text{(Eqn. 8)}$$

$$QP_P = QP_{PreviousP} + dqp_P \quad \text{(Eqn. 9)}$$

where c=1.5
For B pictures:

$$Bits_B = K_{2P} * Bits_{PreviousP} + K_{2B} * Bits_{PreviousB}$$

$$dqp_B = \log_d Bits_B / Ptargetbits$$

$$QP_B = QP_{previousB} + dqp_B \quad \text{(Eqn. 10)}$$

where $K_{2P} + K_{2B} = 1$, here $K_{2P}=\frac{1}{2}$; $Bits_{PreviousP}$ is average bits of the previous two encoded P pictures; d is base, here d=1.8;

The function between QP and bit-rate has been found $$QP = -K\log_\alpha br + C \quad \text{(Eqn. 11)}$$

$$K = -\frac{25}{9}, C = 38.8, \alpha = 1.6$$

If the bit-rate is changed from $br_1$ to $Br_2$, the QP should be changed to $QP_2$, $$QP_2 = K\log_\alpha \frac{br_1}{br_2} + QP_1 \quad \text{(Eqn. 12)}$$

Thus, in operation of exemplary embodiments of the present invention, the encoder 100 and quantizer 130 of FIG. 1 implement the method 200 of FIG. 2. At step 210 of FIG. 2, the encoder prepares to encode a new Group of Pictures (GOP). A GOP is defined as the pictures between two Intra coded pictures, including the first Intra coded picture but not the second intra coded picture. At step 215, the first GOP Quantizer Parameter (QP) is initialized from statistical data collected experimentally. Exemplary statistical data may include, for example, 1) picture size: 352×288 (CIF), frame rate 30 Hz, QP is initialized to $(10^6\text{-bit-rate})/10^5+30$; 2) picture size: 720×480 (SD), frame rate 24 Hz, Film, QP= $(4*10^6\text{-bit-rate})/3*10^6+20$; and 3) picture size: 1920×1088 (HD), frame rate 24 Hz, film, QP=$(10^7\text{-bit-rate})/5*10^6+26$.

At step 220 of FIG. 2, the encoder calculates target bits for the GOP as:

$$TargetBits_{GOP} = \frac{BitRate * NumberOfPicturesInGOP}{PictureRate} \qquad (\text{Eqn. 13})$$

At step 225, the encoder determines the bits available to the GOP as the target bit count plus the bits that are saved from encoding previous GOPs or minus the bits that are overused by previous GOPs. At step 230, a bit budget is made for each type of picture. The numbers of bits for I, P and B pictures are calculated from the following formulas, respectively:

$$Itargetbits = \frac{TargetBits_{GOP} * IeB}{IeB + N_P * PeB + N_B} \qquad (\text{Eqn. 14})$$

$$Ptargetbits = \frac{TargetBits_{GOP} * PeB}{IeB + N_P * PeB + N_B}$$

$$Btargetbits = \frac{TargetBits_{GOP}}{IeB + N_P * PeB + N_B}$$

This bit budget is recalculated after each picture is encoded. At step 235, the difference QP (dqp) and QP of a GOP are calculated from the following formula:

dqp=$\log_b$PreGOPBitsUsed/Bits$_{GOP}$ $QP_{GOP}$=$QP_{PreviousGOP}/(I_B+P_B*N_P+N_B)$+dqp   (Eqn. 15)

This formula comes from the Bit-rate-QP model of the present invention. At step 240, a QP is calculated for each picture. For an I-picture, the QP of the I picture is the QP of the GOP. For a P-picture, the target bit count for a P picture is computed from the bits used by the previous P and B pictures and the bits available for the picture, and the dqp is calculated from that.

dqp$_P$=$\log_c$Bits$_P$/Ptargetbits   (Eqn. 16)

The formula of Equation 16, above, also comes from the model of the present invention. For a B-picture, the target bit count for a B-picture is computed from previous B and P pictures and the available bits for the picture, and from that the dqp is calculated.

Bits$_B$=$K_{2P}$*Bits$_{PreviousP}$+$K_{2B}$*Bits$_{PreviousB}$ dqp$_B$=$\log_d$Bits$_B$/Ptargetbits $QP_B$=$QP_{previousB}$+dqp$_B$   (Eqn. 17)

For more fine rate control, the QP of each block or macroblock is calculated. The target bit count for each type of block is computed, and a like approach is used to calculate the dqp for each block. At step 245, a picture is encoded using the QP obtained from the previous steps. If a finer rate control is used, each block is encoded from the QP obtained from the previous steps, and the average QP is used for reference to the next pictures. At step 250, when a picture is encoded, the actual number of bits is counted, and the average QP is calculated. At step 255, if all pictures in the GOP are encoded, the QP of the GOP is computed by using a weighted average of QPs of all pictures in the GOP, as shown below in Equation 18. Otherwise, the next picture is encoded in the same manner described above.

$$QP_{PreviousGOP} = I_B * QP_I + P_B \sum_{i=0}^{N_P} QP_{Pi} + \sum_{i=0}^{N_B} QP_{Bi} \qquad (\text{Eqn. 18})$$

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. For example, alternate embodiments may encode an exact average bit-rate when sequence length or capacity are known, implement rate control by using two complete two-pass encoding, optimize bit assignment inside of a picture, recognize a scene change, utilize a statistical multiplexer, and/or implement rate control for layered data, such as for JVT and/or MPEG. All such changes and modifications are intended to be included within the scope of the present invention as set forth in the appended claims.

What is claimed is:

1. An apparatus, comprising:
a video encoder for encoding video signal data for a group of pictures (GOP) formed of I, B and P pictures, the encoder comprising an input for receiving the video signal data and an adaptive quantizer including a hardware processor for applying an adaptive quantizer parameter responsive to a current bit-rate,
wherein the hardware processor of the adaptive quantizer is configured to: calculate a bit budget for encoding at least one item from within the GOP, wherein the calculation (i) determines a number of bits for the GOP, (ii) allocates bits for I, P, and B pictures in the GOP, (iii) determines a quantizer parameter for the I picture by dividing a quantizer parameter of a previous GOP by a constant representative of the number of respective P and B pictures included in the GOP and adding the result to a differential quantizer parameter, (iv) determines a quantizer parameter for a P picture by adding a quantizer parameter for a previous P picture to a differential quantizer parameter for a P picture, and (v) calculates a quantizer parameter for a B picture, by adding a quantizer parameter for a previous B picture to a differential quantizer parameter for a B picture; and
wherein the quantizer parameter is responsive to said calculated bit budget.

2. The apparatus of claim 1, wherein the length of the image sequence is unknown.

3. The apparatus of claim 1, wherein the group of pictures comprises pictures between two adjacent intra coded pictures and including the first intra coded picture.

4. The apparatus of claim 1, wherein an initial bit budget ratio for I, P, and B types of pictures is I:P:B=6:3:1.

5. The apparatus of claim 1, wherein an initial bit budget ratio for the group of pictures is initialized to a bit budget ratio resulting from a previous group of pictures.

6. A method for encoding a group of pictures at a video encoder including an input for receiving the group of pictures and providing the group of pictures to an adaptive quantizer, comprising, at a hardware processor of the adaptive quantizer:
calculating a bit budget for encoding at least one item from within said group of pictures (GOP), wherein the calculating comprises:
determining the number of bits for said GOP;
allocating corresponding number of bits to I, P and B pictures in the GOP;
adjusting a quantizer parameter responsive to said calculated bit budget;
determining a quantizer parameter for said I picture by dividing a quantizer parameter of a previous group of pictures by a constant representative of the number of respective P and B pictures in the GOP and adding the result to a differential quantizer parameter;
determining a quantizer parameter for a P picture, by adding a quantizer parameter for a previous P picture to a differential quantizer parameter for a P picture;
determining a quantizer parameter for a B picture, by adding a quantizer parameter for a previous B picture to a differential quantizer parameter for a B picture; and
iteratively repeating said calculating and adjusting to further adjust said quantizer parameter.

7. A method as defined in claim 6, the group of pictures comprising pictures between two adjacent intra coded pictures and including the first intra coded picture.

8. A method as defined in claim 6 wherein the length of the group of pictures is unknown.

9. The method of claim 6, wherein an initial bit budget ratio for I, P, and B types of pictures is I:P:B=6:3:1.

10. The method of claim 6, wherein an initial bit budget ratio for the group of pictures is initialized to a bit budget ratio resulting from a previous group of pictures.

11. An apparatus for encoding a group of pictures comprising an adaptive quantizer including a hardware processor, said hardware processor being configured to:
calculate a bit budget for encoding at least one item from within said group of pictures (GOP), wherein calculating the bit budget comprises:
determining the number of bits for said GOP;
allocating corresponding number of bits to I, P and B pictures in the GOP;
adjust a quantizer parameter responsive to said calculated bit budget by determining a quantizer parameter for said I picture by dividing a quantizer parameter of a previous group of pictures by a constant representative of the number of respective P and B pictures in the GOP and adding the result to a differential quantizer parameter;
determining a quantizer parameter for a P picture, by adding a quantizer parameter for a previous P picture to a differential quantizer parameter for a P picture;
determining a quantizer parameter for a B picture, by adding a quantizer parameter for a previous B picture to a differential quantizer parameter for a B picture; and
iteratively repeat said calculating and adjusting to further adjust said quantizer parameter.

12. The apparatus of claim 11, wherein the group of pictures comprises pictures between two adjacent intra coded pictures and including the first intra coded picture.

13. The apparatus of claim 11, wherein an initial bit budget ratio for I, P, and B types of pictures is I:P:B=6:3:1.

14. The apparatus of claim 11, wherein an initial bit budget ratio for the group of pictures is initialized to a bit budget ratio resulting from a previous group of pictures.

15. A non-transitory processor readable storage medium readable by machine, storing a computer program product comprising program code instructions executable by the machine for encoding a group of pictures, said program code instructions:
calculating a bit budget for encoding at least one item from within said group of pictures (GOP), wherein the calculating comprises:
determining the number of bits for said GOP;
allocating corresponding number of bits to I, P and B pictures in the GOP; and
adjusting a quantizer parameter responsive to said calculated bit budget by:
determining a quantizer parameter for said I picture by dividing a quantizer parameter of a previous group of pictures by a constant representative of the number of respective P and B pictures in the GOP and adding the result to a differential quantizer parameter;
determining a quantizer parameter for a P picture, by adding a quantizer parameter for a previous P picture to a differential quantizer parameter for a P picture;
determining a quantizer parameter for a B picture, by adding a quantizer parameter for a previous B picture to a differential quantizer parameter for a B picture; and
iteratively repeating said calculating and adjusting to further adjust said quantizer parameter.

16. The non-transitory processor readable storage medium of claim 15, wherein the group of pictures comprises pictures between two adjacent intra coded pictures and including the first intra coded picture.

17. The non-transitory processor readable storage medium of claim 15, wherein an initial bit budget ratio for I, P, and B types of pictures is I:P:B=6:3:1.

18. The non-transitory processor readable storage medium of claim 15, wherein an initial bit budget ratio for the group of pictures is initialized to a bit budget ratio resulting from a previous group of pictures.

* * * * *